United States Patent
Le Faucheur et al.

(10) Patent No.: US 9,014,321 B2
(45) Date of Patent: Apr. 21, 2015

(54) CLOCK DRIFT COMPENSATION INTERPOLATOR ADJUSTING BUFFER READ AND WRITE CLOCKS

(75) Inventors: Laurent Le Faucheur, Antibes (FR); Eric Louis Pierre Badi, Cagnes sur Mer (FR)

(73) Assignee: Texas Instruments Incorporated, Dallas, TX (US)

(*) Notice: Subject to any disclaimer, the term of this patent is extended or adjusted under 35 U.S.C. 154(b) by 606 days.

(21) Appl. No.: 13/292,227

(22) Filed: Nov. 9, 2011

(65) Prior Publication Data

US 2013/0107930 A1 May 2, 2013

(30) Foreign Application Priority Data

Oct. 31, 2011 (EP) .................................... 11290505

(51) Int. Cl.
*H04L 7/00* (2006.01)
*H04J 3/06* (2006.01)

(52) U.S. Cl.
CPC .................................... *H04J 3/0632* (2013.01)

(58) Field of Classification Search
CPC ........... G06F 13/38; G06F 13/10; G06F 3/00; G06F 5/14; G06F 13/16; G06F 13/1673; G06F 1/10; G06F 9/544; H04L 47/10; H04L 49/254; H04L 7/005; H04W 28/0278; G05B 19/05; G11C 7/20; G11C 7/22; G11C 7/222; Y02B 60/1228

USPC ......... 375/354, 355, 372, 371, 362, 359, 373; 710/1, 17, 22, 23, 29, 31, 46, 47, 48, 710/52, 53, 56, 57, 60, 2, 3, 74

See application file for complete search history.

(56) References Cited

U.S. PATENT DOCUMENTS

| | | | | |
|---|---|---|---|---|
| 5,778,218 A | * | 7/1998 | Gulick | 713/503 |
| 5,958,027 A | * | 9/1999 | Gulick | 710/300 |
| 5,995,570 A | * | 11/1999 | Onvural et al. | 375/356 |
| 2006/0209684 A1 | * | 9/2006 | Bei | 370/229 |
| 2008/0266454 A1 | * | 10/2008 | Lin et al. | 348/547 |
| 2010/0321568 A1 | * | 12/2010 | Le Pifre | 348/462 |

OTHER PUBLICATIONS

Makundi, M. et al., "Efficient Tunable IIR Allpass Filter Structures," Electronic Letters, Mar. 15, 2001, vol. 37, No. 6, pp. 344-345.

* cited by examiner

*Primary Examiner* — Sam K Ahn
*Assistant Examiner* — Linda Wong
(74) *Attorney, Agent, or Firm* — Lawrence J. Bassuk; Frank D. Cimino

(57) ABSTRACT

In at least some embodiments, an electronic device includes a data sink and a buffer coupled to the data sink. The buffer is configured to receive streaming data in transit to the data sink. The electronic device also includes a clock drift compensation controller coupled to the buffer, wherein the clock drift compensation controller is configured to apply either of two predetermined clock drift compensation values to a clock rate for the buffer whenever a buffer fullness status value is offset from a predetermined threshold.

3 Claims, 4 Drawing Sheets

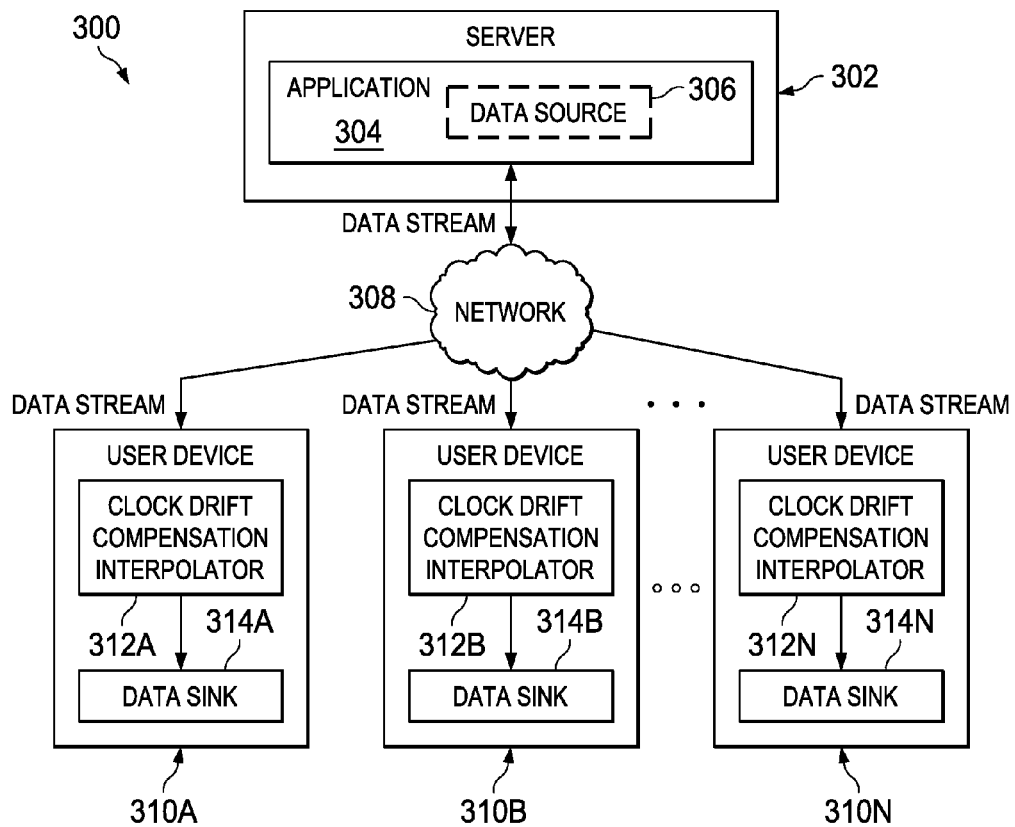
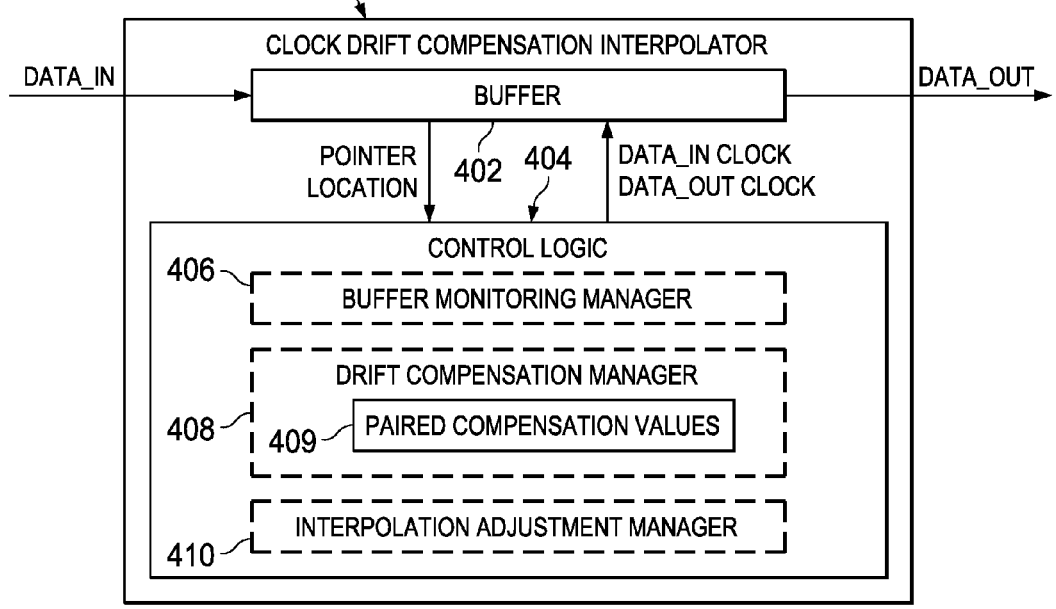

CLOCK DRIFT COMPENSATION INTERPOLATOR ADJUSTING BUFFER READ AND WRITE CLOCKS

CROSS-REFERENCE TO RELATED APPLICATION

The present application claims priority to EP Patent Application No. 11290505.4, filed on Oct. 31, 2011; which is hereby incorporated herein by reference.

BACKGROUND

There are times when two systems or components operating at two different clocks rates need to be interfaced. Such an interface is difficult in the sense that the design becomes asynchronous at the boundary of interface. Clock drift for either system or component needs to be accounted for to avoid overflow or underflow of buffers at the interface. Various clock drift compensation techniques exist, which involve estimating the clock drift and thereafter compensating accordingly for the estimated clock drift. Unfortunately, continuously estimating clock drift is computationally expensive.

SUMMARY

The problems noted above are solved in large part by an electronic device comprising a data sink and a buffer coupled to the data sink. The buffer is configured to receive streaming data in transit to the data sink. The electronic device also comprises a clock drift compensation controller coupled to the buffer. The clock drift compensation controller is configured to apply either of two predetermined clock drift compensation values to a clock rate for the buffer whenever a buffer fullness status value is offset from a predetermined threshold.

Further, in at least some embodiments, a clock drift compensation interpolator comprises a buffer and control logic coupled to the buffer. The control logic is configured to apply a first predetermined clock drift compensation value to a clock rate for the buffer when a buffer fullness status value is above a predetermined threshold and to apply a second predetermined clock drift compensation value to the clock rate for the buffer when the buffer fullness status value is below the predetermined threshold.

Further, in at least some embodiments, a method for clock drift compensation comprises monitoring a buffer fullness status. When the monitored buffer fullness status is above a predetermined threshold, the method comprises applying a first of two paired clock drift compensation values to a clock rate for the buffer. When the monitored buffer fullness status is below the predetermined threshold, the method comprises applying a second of the two paired clock drift compensation values to the clock rate for the buffer.

BRIEF DESCRIPTION OF THE DRAWINGS

For a detailed description of exemplary embodiments of the invention, reference will now be made to the accompanying drawings in which:

FIG. 3 shows a communication system in accordance with embodiments of the disclosure;

FIG. 4 shows details of a clock drift interpolator in accordance with embodiments of the disclosure;

NOTATION AND NOMENCLATURE

Figure 1:
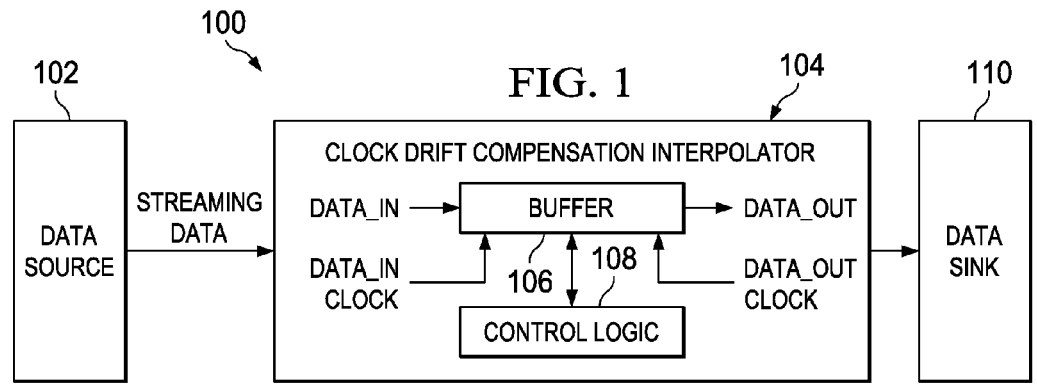
FIG. 1 shows a system in accordance with embodiments of the disclosure.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . . " Also, the term "couple" or "couples" is intended to mean either an indirect or direct electrical connection. Thus, if a first device couples to a second device, that connection may be through a direct electrical connection, or through an indirect electrical connection via other devices and connections. Also, the term "clock drift compensation interpolation" is intended to mean application of either of two different clock drift compensation values in response to a drift detection mechanism.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Disclosed herein are methods and systems for clock drift compensation between a data source and a data sink. In at least some embodiments, clock drift compensation is performed without a drift estimation being computed. Instead, clock drift compensation is based on monitoring a buffer (e.g., a FIFO buffer) pointer position (indicative of a buffer fullness status) and applying either of two clock drift compensation values based on the buffer pointer position. For example, a clock drift compensation controller may apply a positive clock drift compensation value to a data_out clock of a buffer (e.g., a first-in first-out (FIFO) buffer) when the buffer fullness status is above a predetermined threshold, and may apply a negative clock drift compensation value to the data_out clock of the buffer when the buffer fullness status is below the predetermined threshold. Alternatively, a clock drift controller may apply a positive clock drift compensation value to a data_in clock of a buffer when the buffer fullness status is below a predetermined threshold, and may apply a negative clock drift compensation value to the data_in clock of the buffer when the buffer fullness status is above the predetermined threshold.

Although not required, at least some disclosed embodiments for clock drift compensation interpolation are applied to an audio stream scenario, where an audio source in not in sync with an audio sink. For example, the audio source may be a web-radio and the audio sink may be a digital-to-analog (D/A) port associated with an acoustic transducer on a consumer device in communication with the web-radio. In such a scenario, it is assumed that the data rate from the web-radio and the consumption rate of the D/A port are not controlled. Instead of synchronizing the data source and the data sink, a clock drift compensation interpolator is provided between the web-radio and the D/A port of the consumer device. The clock drive compensation interpolator may operate as described in greater detail herein.

FIG. 1 shows a system 100 in accordance with embodiments of the disclosure. As shown, the system 100 comprises a data source 102 in communication with a data sink 110 via a clock drift compensation interpolator 104. The clock drift compensation interpolator 104 comprises a buffer 106 and control logic 108 in communication with the buffer 106. The buffer 106, for example, may be an asynchronous buffer (e.g., an asynchronous FIFO) with separate clocks for writing data into the buffer 106 and for reading data out of the buffer 106. The write clock may be referred to herein as a data_in clock, while the read clock may be referred to herein as a data_out clock.

In accordance with at least some embodiments, the clock drift compensation interpolator 104 applies drift compensation values to the read clock or the write clock of the buffer 106 due to changes in the data source clock rate over time and/or due to changes the data sink clock rate over time. For example, the clock drift compensation interpolator 104 may apply either of two predetermined clock drift compensation values to a clock rate for the buffer 106 when a buffer fullness status value is offset from a predetermined threshold. In some embodiments, the clock drift compensation interpolator 104 may apply a null clock drift compensation value if the buffer fullness status value is at the predetermined threshold. The predetermined threshold may correspond to a midpoint fullness level of the buffer 106, but alternative thresholds are possible. Further, the predetermined threshold may correspond to a range of fullness levels rather than a particular level. In at least some embodiments, the buffer fullness level is determined by monitoring a pointer of the buffer 106 that tracks the latest register written to or the next register to be written to. If the buffer 106 corresponds to a FIFO buffer, the buffer fullness level would be determined, for example, by monitoring a pointer of the FIFO buffer.

Although different embodiments may vary, the two (paired) predetermined clock drift compensation values may comprise a positive drift compensation value and a negative drift compensation value, where the negative drift value has the same magnitude as the positive drift compensation value. The positive and negative drift values may, for example, be determined based on previous calculations or specifications provided for the data source or data sink. Alternatively, the positive and negative drift values may be determined over time by monitoring parameters such as the buffer fullness level, the buffer filling rate, or the buffer emptying rate. As an example, the control logic 108 of the clock drift compensation interpolator 104 may monitor a buffer filling rate. If the buffer filling rate is above a maximum fill rate threshold, the control logic 108 may increase a difference between the two predetermined clock drift compensation values (e.g., by increasing their magnitudes). Similarly, if a buffer emptying rate is above a maximum emptying rate threshold, the control logic 108 may increase a difference between the two predetermined clock drift compensation values. Alternatively, if the buffer filling rate is below a minimum fill rate threshold, the control logic 108 may decrease a difference between the two predetermined clock drift compensation values (e.g., by decreasing their magnitudes). Similarly, if a buffer emptying rate is below a minimum emptying rate threshold, the control logic 108 may decrease a difference between the two predetermined clock drift compensation values.

In some embodiments, the clock drift compensation interpolator 104 supports synchronizing the data_in clock of the buffer 106 with a data source clock. For example, if the clock drift interpolator 104 is implemented in an electronic device with the data source 102, the data_in clock of the buffer 106 could be synchronized with the data source clock. In other words, the data source 102 may operate as master of the data_in clock of the buffer 106. In such case, the clock drift compensation interpolator 104 is able to adjust the data_out clock of the buffer 106, but not the data_in clock. Accordingly, the clock drift compensation interpolator 104 may apply a negative drift compensation value to the data_out clock of the buffer 106 when the buffer fullness status value is above the predetermined threshold. Further, the clock drift compensation interpolator 104 may apply a positive drift compensation value to the data_out clock of the buffer 206 when the buffer fullness status value is below the predetermined threshold.

Alternatively, the clock drift interpolator 104 supports synchronizing the data_out clock of the buffer 106 with the data sink clock. For example, if the clock drift compensation interpolator 104 is implemented in an electronic device with the data sink 110, the data_out clock of the buffer 106 could be synchronized with the data sink clock. In other words, the data sink 110 operates as a master of the data_out clock of the buffer 106. In such case, the clock drift compensation interpolator 104 is able to adjust the data_in clock of the buffer 106, but not the data_out clock. Accordingly, the clock drift compensation interpolator 104 may apply a negative drift compensation value to the data_in clock of the buffer 106 when the buffer fullness status value is above the predetermined threshold. Further, the clock drift compensation interpolator 104 may apply a positive drift compensation value to the data_in clock of the buffer 206 when the buffer fullness status value is below the predetermined threshold.

If both the data source 102 and the data sink 110 are to operate as master, the clock drift compensation interpolator 104 could implement multiple buffers, where the data_in clock of the first buffer is synchronized with the data source 102 and the data_out clock of the second buffer is synchronized with the data sink 110. In such case, the clock drift interpolator may apply clock drift compensation to the data_out clock of the first buffer and/or the data_in clock of the second buffer. Further, in some embodiments, multiple clock drift compensation interpolators 104 could be positioned between the data source 102 and the data sink 110, where the data_in clock of the buffer in the first clock drift compensation interpolator is synchronized with the data source 102 and the data_out clock of the buffer in second clock drift compensation interpolator is synchronized with the data sink 110. In such case, the first clock drift compensation interpolator may apply clock drift compensation to the data_out clock of its buffer and/or the second clock drift compensation interpolator may apply clock draft compensation to the data_in clock of its buffer.

Figure 2A:
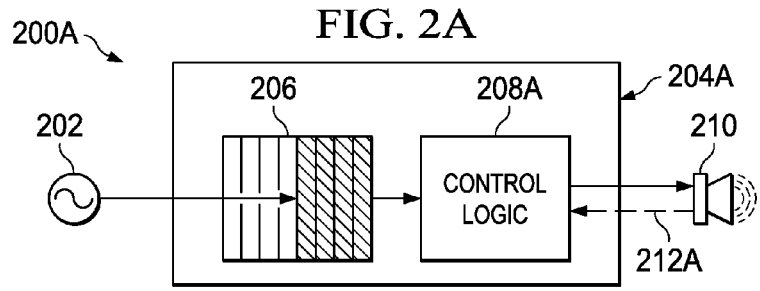
FIG. 2A-2C show different variations of a clock drift interpolator in accordance with embodiments of the disclosure.
Figure 2B:
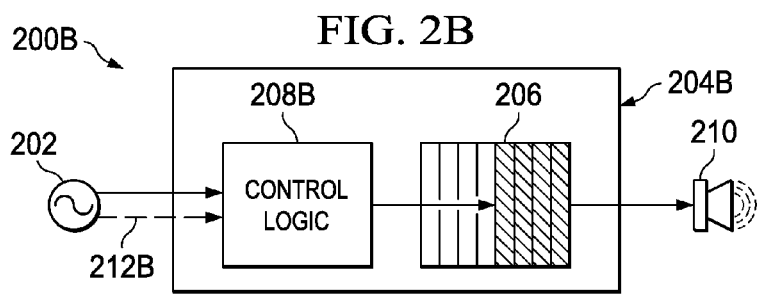
Figure 2C:
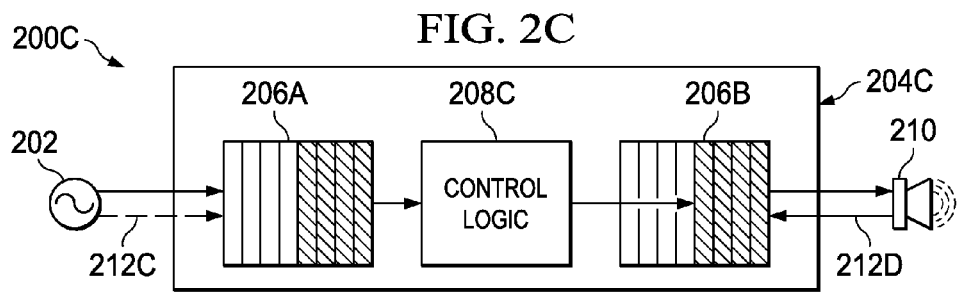

FIG. 2A-2C show different variations of clock drift compensation interpolators in accordance with embodiments of the disclosure. In FIG. 2A, a clock drift compensation interpolator 204A couples to and is synchronized (represented by arrow 212A) with a data sink 210 that operates as a master on the clock. The clock drift compensation interpolator 204A comprises a FIFO buffer 206 that receives a data stream from the data source 202, where the data source clock may drift over time. The FIFO buffer 206 couples to control logic 208A, which applies either of two clock drift compensation values to the read clock (data_out clock) of the FIFO buffer 206 based on a pointer position for the FIFO buffer 206 as described herein.

In FIG. 2B, a clock drift compensation interpolator 204B couples to and is synchronized (represented by arrow 212B) with the data source 202. The clock drift interpolator 204B comprises a FIFO buffer 206 and control logic 208B. In FIG. 2B, the clock drift interpolator 204B receives a data stream from the data source 202 and forwards the data stream to the data sink 210 via the FIFO buffer 206, where the data sink clock may drift over time. In FIG. 2B, the control logic 208B is configured to apply either of two clock drift compensation values to the write clock (data_in clock) of the FIFO buffer 206 based on a pointer position for the FIFO buffer 206 as described herein.

In FIG. 2C, a clock drift interpolator 204C having control logic 208C between two FIFO buffers 206A and 206B is shown. The data_in clock of the FIFO buffer 206A is synchronized (represented by arrow 212C) with the data source 202 and the data_out clock of the FIFO buffer 206B is synchronized (represented by arrow 212D) with the data sink 210. In FIG. 2C, the control logic 208C is configured to apply either of two clock drift compensation values to the read clock (data_out clock) of the FIFO buffer 206A based on a pointer position for the FIFO buffer 206A and to apply either of two clock drift compensation values to the write clock (data_in clock) of the FIFO buffer 206B based on a pointer position for the FIFO buffer 206B as described herein.

FIG. 3 shows a communication system 300 in accordance with embodiments of the disclosure. As shown, the communication system 300 comprises a server 302 in communication with a plurality of user devices 310A-310N via a network 308. The user devices 310A-310N may be computing devices such as desktop computers, laptop computers, cell phones, smart phones, tablet computer, or other devices. In at least some embodiments, the server 302 comprises an application 304 that operates as a data source 306. For example, the application 304 may comprise a web-radio that operates as the data source 306 by outputting streaming audio data.

Regardless of the type of data stream, each of the user devices 310A-310N comprises a corresponding data sink 314A-314N for the data stream output by data source 306. Before the data stream from the data source 306 reaches data sinks 314A-314N, each of the clock drift compensation interpolators 312A-312N is configured to selectively apply either of two clock drift compensation values as described herein.

FIG. 4 shows details of a clock drift compensation interpolator 400 in accordance with embodiments of the disclosure. As shown, the clock drift compensation interpolator 400 comprises a buffer 402 and control logic 404. In at least some embodiments, the buffer 402 provides pointer location information to the control logic 404. Meanwhile, the control logic provides a clock drift compensation adjustment to a data_in clock or a data_out clock for the buffer 402.

More specifically, the control logic 404 comprises a buffer monitoring manager 406 that operates to monitor the buffer fullness status of the buffer 402 based on the pointer location. The buffer monitoring manager 406 may also determine a buffer filling rate or a buffer emptying rate based on the pointer location information. In response to a determination of the buffer fullness status by the buffer monitoring manager 406, a drift compensation manager 408 operates to apply either of two different clock drift compensation values 409 to a data_in clock or to a data_out clock of the buffer 402. The two different clock drift compensation values 409 may be predetermined and stored by the drift compensation manager 408. Although not required, the two clock drift compensation values 409 may correspond to a paired positive drift compensation value and negative drift compensation value. Alternatively, the two clock drift compensation values 409 may be two positive values or two negative values that are separated by a predetermined amount (e.g., 100 parts per million (ppm)). In some embodiments, if the pointer location is not offset from a predetermined threshold of the buffer 402, the clock rate manager 408 does not apply any clock drift compensation value to the data_in clock or the data_out clock of the buffer 402.

As needed, the clock drift compensation values 409 stored by the drift compensation manager 408 may be updated. In such case, the interpolation adjustment manager 410 may determine the amount of adjustment that is made. In some embodiments, the adjustment is based on determining the difference between a write clock rate and a read clock rate of the buffer 402 and adjusting the clock drift compensation values 409 in proportion to this difference. Alternatively, the adjustment to clock drift compensation values 409 may be made by the interpolation adjustment manager 410 in proportion to the buffer filling rate or the buffer emptying rate monitored by the buffer monitoring manager 406.

Figure 5:
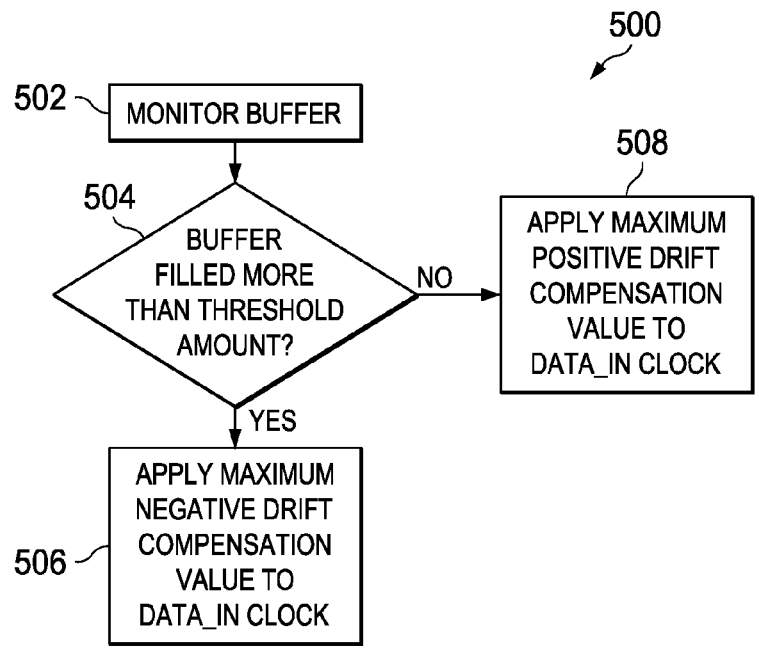
FIG. 5 shows a method for clock drift compensation in accordance with embodiments of the disclosure.

In accordance with at least some embodiments, the clock drift compensation interpolator 400 either makes a compensation using a maximum positive drift value (e.g., +100 ppm) or makes a drift compensation using the maximum negative drift value (e.g., −100 ppm). There are no intermediate values for the drift compensation, except perhaps a null value. However, the two clock drift compensation values 409 can be adjusted dynamically should such adjustment be needed. The decision to switch between which of the two drift compensation values is decided upon the flow detection observed on the FIFO associated with a serial port in the path between a data source and a data sink. If the FIFO pointer is below or equal to a nominal position, the first drift compensation value is selected. Meanwhile, if the FIFO pointer is greater than the nominal position, the second drift compensation value is selected FIG. 5 shows a method 500 for clock drift compensation in accordance with embodiments of the disclosure. The method 500 may be performed, for example, by a clock drift compensation interpolator that is synchronized with a data sink. As shown, the method 500 comprises monitoring a buffer (block 502). If the buffer is filled more than a threshold amount (decision block 504), a maximum negative drift compensation value is applied to a data_in clock of the buffer (block 506). On the other hand, if the buffer is not filled more than the threshold amount (decision block 504), a maximum positive drift compensation value is applied to a data_in clock of the buffer (block 508).

Figure 6:
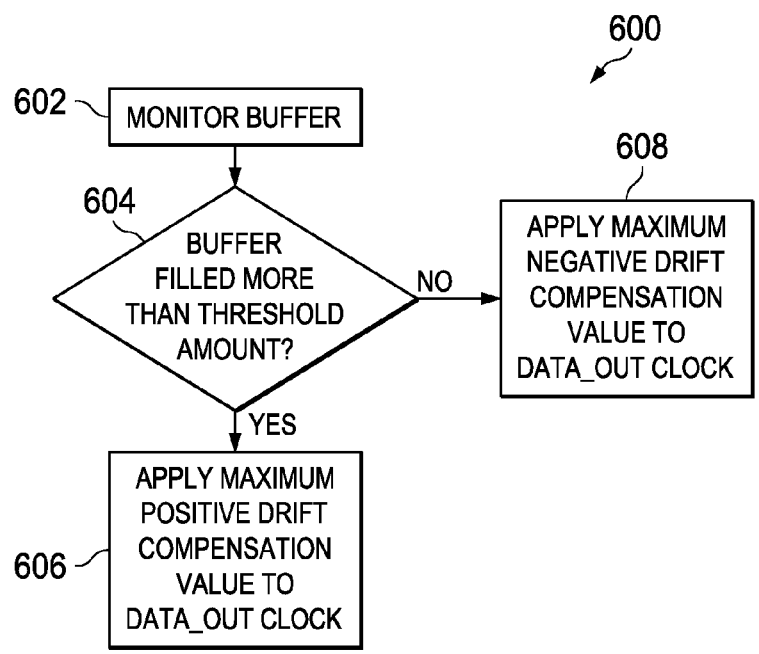
FIG. 6 shows another method for clock drift compensation in accordance with embodiments of the disclosure.

FIG. 6 shows another method 600 for clock drift compensation in accordance with embodiments of the disclosure. The method 600 may be performed, for example, by a clock drift compensation interpolator that is synchronized with a data sink. As shown, the method 600 comprises monitoring a buffer (block 602). If the buffer is filled more than a threshold amount (decision block 604), a maximum positive drift compensation value is applied to a data_out clock of the buffer (block 606). On the other hand, if the buffer is not filled more than the threshold amount (decision block 604), a maximum negative drift compensation value is applied to a data_out clock of the buffer (block 608).

Figure 7:
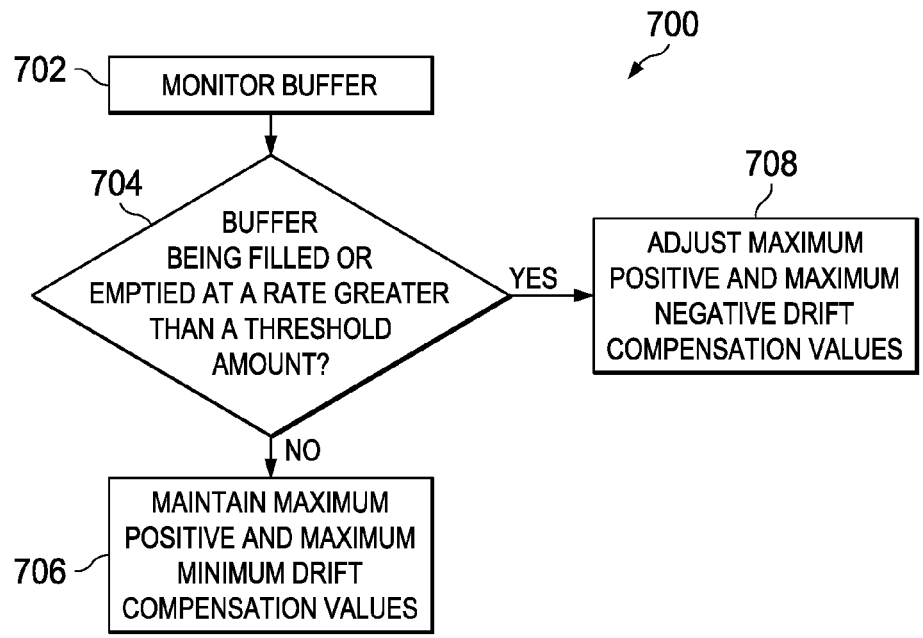
FIG. 7 shows a method for adjusting clock drift compensation in accordance with embodiments of the disclosure.

FIG. 7 shows a method 700 for adjusting clock drift compensation in accordance with embodiments of the disclosure.

The method 700 may be performed, for example, by a clock drift compensation interpolator operating between a data source and a data sink. As shown, the method 700 comprises monitoring a buffer 702. If the buffer is not being filled or emptied at a rate greater than a threshold amount (decision block 704), maximum positive and maximum negative drift values are maintained (block 706). On the other hand, if the buffer is not being filled or emptied at a rate greater than a threshold amount (decision block 704), maximum positive and maximum negative drift values are adjusted (block 708). In an alternative technique, adjustments to the maximum positive and maximum negative drift values may be based on determining the different between a read clock rate and a write clock rate for a buffer.

The disclosed clock drift compensation interpolation technique is simple to implement. For example, there is no drift estimation needed. In an example, the interpolation filter either makes +100 ppm compensation or switches (toggles) to −100 ppm. Further, there is no computation of read/write pointers distances. Instead, drift compensation will continuously switch from +100 ppm to −100 ppm similar to how PDM delta-sigma modulation operates. Further, signal degradation is marginal.

Figure 8:
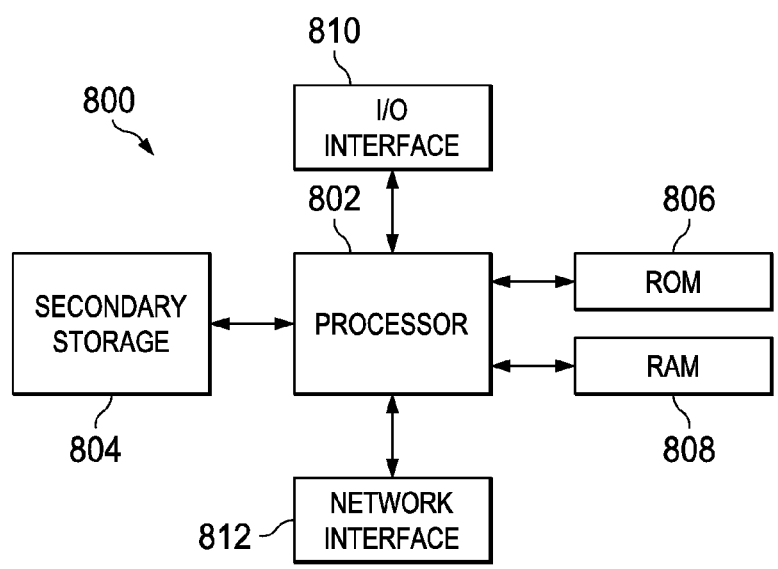
FIG. 8 shows a computer system in accordance with various examples of the disclosure.

The server, the user devices, the data sources, the data sinks, and the clock drift compensation interpolation components and operations as described above may be implemented with any general-purpose computing component, such as an application-specific integrated chip (ASIC), a computer, or a network component with sufficient processing power, memory resources, and network throughput capability to handle the necessary workload placed upon it. FIG. 8 illustrates a typical, general-purpose computer system 800 suitable for implementing one or more embodiments of the components disclosed herein. The computer system 800 includes a processor 802 (which may be referred to as a central processor unit or CPU) that is in communication with memory devices including secondary storage 804, read only memory (ROM) 806, and random access memory (RAM) 808, with an input/output (I/O) interface 810, and with a network interface 812. The processor 802 may be implemented as one or more CPU chips, or may be part of one or more application specific integrated circuits (ASICs).

The secondary storage 804 is typically comprised of one or more disk drives, flash devices, or tape drives and is used for non-volatile storage of data and as an over-flow data storage device if RAM 808 is not large enough to hold all working data. Secondary storage 804 may be used to store programs that are loaded into RAM 808 when such programs are selected for execution. The ROM 806 is used to store instructions and perhaps data that are read during program execution. ROM 806 is a non-volatile memory device that typically has a small memory capacity relative to the larger memory capacity of secondary storage 804. The RAM 808 is used to store volatile data and perhaps to store instructions. Access to both ROM 806 and RAM 808 is typically faster than to secondary storage 804.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A clock drift compensation interpolator comprising:
   a buffer; and
   control logic coupled to the buffer, the control logic being configured to apply a first clock drift compensation value to a clock rate for the buffer when a buffer fullness status value is above a threshold and to apply a second clock drift compensation value to the clock rate for the buffer when the buffer fullness status value is below the threshold, the control logic being configured to determine a difference between a read clock value and a write clock value for the buffer and to adjust the first and second clock drift compensation values based on the difference.

2. The clock drift compensation interpolator of claim 1, wherein the control logic determines the buffer fullness status value and a rate of change for the buffer fullness status value based on monitoring a pointer location for the buffer.

3. The clock drift compensation interpolator of claim 1, wherein the first clock drift compensation value is a positive drift compensation value and wherein the second clock drift compensation is a negative drift compensation value equal in magnitude to the positive drift compensation value, and wherein the control logic is configured to toggle application of the positive and negative drift compensation values to a write clock for the buffer.

* * * * *